United States Patent [19]
Rosenberg

[11] Patent Number: 5,752,547
[45] Date of Patent: May 19, 1998

[54] FLUID FLOW CONTROL VALVE

[76] Inventor: Peretz Rosenberg, Moshav Beit Shearim, 30 046, Israel

[21] Appl. No.: 701,350

[22] Filed: Aug. 15, 1996

[30] Foreign Application Priority Data

Sep. 8, 1995 [IL] Israel .......... 115221

[51] Int. Cl.$^6$ .......... F17D 3/00
[52] U.S. Cl. .......... 137/624.14; 137/509
[58] Field of Search .......... 137/509, 624.14, 137/494, 469, 474

[56] References Cited

U.S. PATENT DOCUMENTS

| | | | |
|---|---|---|---|
| 873,766 | 12/1907 | Matson | 137/624.14 |
| 2,894,712 | 7/1959 | Booth | 137/624.14 |
| 3,886,969 | 6/1975 | Shira | 137/509 |
| 5,099,876 | 3/1992 | Rosenberg | 137/509 |
| 5,144,980 | 9/1992 | Rosenberg | 137/624.14 |

*Primary Examiner*—Denise L. Ferensic
*Assistant Examiner*—Ramyar Farid
*Attorney, Agent, or Firm*—Benjamin J. Barish

[57] ABSTRACT

A fluid flow control valve, comprising: a housing having an inlet connectable to a source of pressurized fluid, an outlet connected to the inlet via a connecting passageway, and a valve opening in the connecting passageway; a valve member movable to an open position and to a closed position with respect to the valve opening; and an actuator for actuating the valve member to its open and closed positions; the actuator including a control chamber which is expansible by receiving a quantity of fluid from the housing inlet and which is contracted by discharging the quantity of fluid from the housing via the housing outlet, whereby repeated operations of the valve repeatedly flush the control chamber with fresh fluid from the source of pressurized fluid.

15 Claims, 2 Drawing Sheets

5,752,547

1

FLUID FLOW CONTROL VALVE

FIELD AND BACKGROUND OF THE INVENTION

The present invention relates to fluid flow control valves. The invention is particularly useful with respect to valves which automatically open and/or close at predetermined times in order to control the flow of a fluid, and is therefore described below with respect to such valves.

There are many applications for valves which open and/or close at predetermined times. For example, one application may be used as a cyclically-operable valve for controlling a water irrigation system in order to periodically turn-on and turn-off the water supply at predefined intervals, in the order of minutes or hours. Another application at the other extreme of time intervals, would be as cyclically-operable valves for use in air hammers and the like for controlling an air supply to produce many rapid oscillations per second.

OBJECTS AND BRIEF SUMMARY OF THE INVENTION

An object of the present invention is to provide a fluid control valve of a construction which is simple, compact, and reliable in operation.

According to the present invention, there is provided a fluid control valve, comprising a housing having an inlet connectible to a source of pressurized fluid, an outlet connected to the inlet via a connecting passageway, and a valve opening in the connecting passageway; a valve member movable to an open position and to a closed position with respect to the valve opening; a spring normally urging the valve member to its closed position with respect to the valve opening; and an actuator for actuating the valve member to its open and closed positions. The actuator includes a valve stem fixed at one end to the valve member and formed with a passageway therethrough leading to its opposite end; a cylinder having an end wall at the opposite end of the stem; a piston displaceable along the stem to positions adjacent to and remote from the cylinder end wall to define therewith an expansible-contractible control chamber connected to the inlet by the passageway in the stem; and a restrictor within the passageway in the stem for restricting the fluid flow between the inlet and the control chamber. The control chamber is expansible, when the valve member is in its closed position, by receiving a quantity of fluid from the housing inlet via the stem passageway to move the valve member to its open position, and is contractible to return the fluid to the housing inlet when the valve member has been moved to its open position to discharge a quantity of fluid from the housing inlet via the housing outlet, whereby repeated operations of the valve repeatedly flush substantially the complete volume of the control chamber, as well as the valve stem passageway and the restrictor, with fresh fluid from the source of pressurized fluid.

According to additional features in the preferred embodiment of the invention described below, the valve further includes a spring normally urging the valve member to its closed position with respect to the valve opening. It also includes a valve stem fixed at one end to the valve member and formed with a passageway leading to the control chamber. The expansible chamber is defined by a piston movable along the stem within a cylinder in the housing.

According to still further features in the described preferred embodiment, the passageway through the valve stem includes a flow restrictor for restricting the flow through the passageway. Such a construction permits the valve to be

2 designed to operate according to a wide range of cyclical periods, from fractions of a second to many minutes or hours, by selecting the appropriate flow restrictor, spring, and other parameters of the construction.

According to still further features in the described preferred embodiment, the coupling includes a lost-motion connection between the piston and the valve member effective, when the piston has been displaced a predetermined amount, to move the valve member to its open position. More particularly, the lost-motion connection includes a second spring which is loaded by the displacement of the piston during the expansion of the control chamber, such as to produce a snap-action opening of the valve member when the piston has been displaced the predetermined amount.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
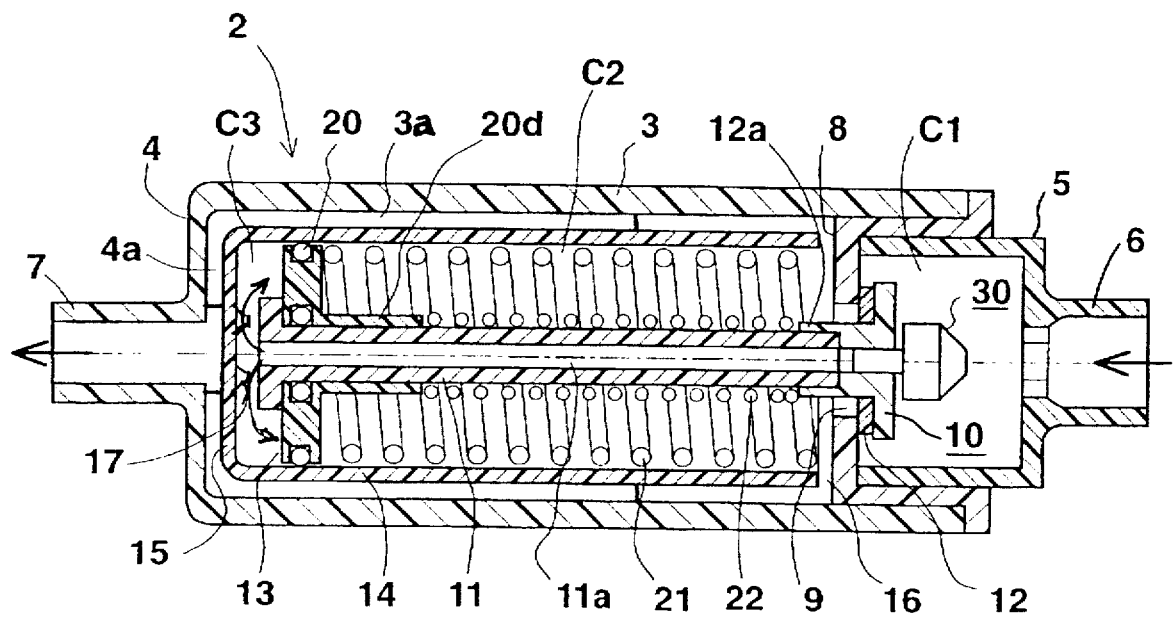
FIG. 1 is a longitudinal sectional view illustrating one form of valve constructed in accordance with the present invention, the valve being shown in its normally-closed condition.

The valve illustrated in the drawings comprises a housing, generally designated 2, constituted of a main cylindrical section 3 closed at one end by an end wall 4, and closed at the opposite end by a collar 5. Collar 5 is formed with an inlet 6 for connection to an upstream pipe (not shown); and end wall 4 is formed with an outlet 7 for connection to the downstream pipe (not shown).

Housing 2 further includes an internal partition 8 between collar 5 and the respective end of the main housing section 3. Partition 8 divides the interior of the housing into an inlet chamber $C_1$ communicating with the inlet 6, and an outlet chamber $C_2$ communicating with the outlet 7. Partition 8 is further formed with a valve opening 9 establishing communication between the inlet chamber $C_1$ and the outlet chamber $C_2$.

Figure 3:
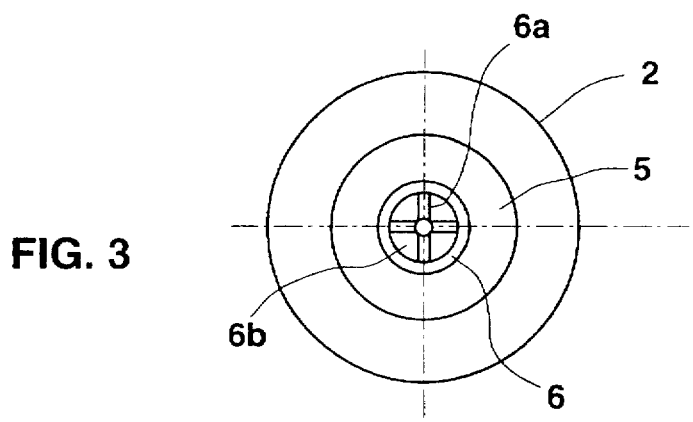
FIG. 3 is an end view, from the inlet end, of the valve of FIGS. 1 and 2.

As shown particularly in FIG. 3, the inlet 6 is integrally formed with crossed ribs 6a defining large passageways 6b between the ribs for inletting the fluid into the inlet chamber $C_1$.

A valve assembly, generally designated 10, is provided within housing 2. Valve assembly 10 includes a valve stem 11 passing through valve opening 9. Valve stem 11 is hollow to define a passageway 11a therethrough. The end of valve stem 11 located within the inlet chamber $C_1$ carries a valve member 12 which is movable to an open position and to a closed position with respect to valve opening 9. The opposite end of valve stem 11 terminates in an annular shoulder 13 adjacent to the housing end wall 4 formed with the outlet 7.

Figure 4:
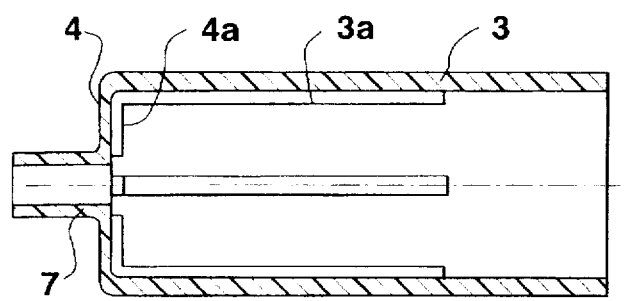
FIG. 4 is a longitudinal sectional view of the housing in the valve of FIGS. 1 and 2.
Figure 5:
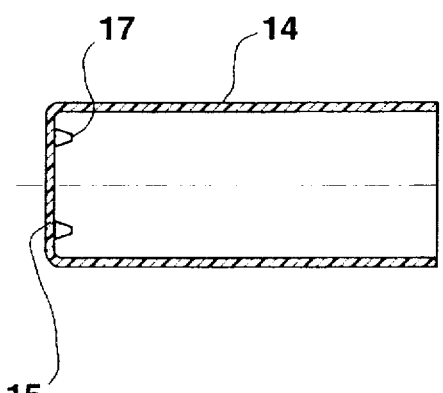
FIG. 5 is a longitudinal sectional view of the cylinder within the housing in the valve of FIGS. 1 and 2.

The inner surface of the main housing section 3 is formed with a plurality of axially-extending, circumferentially-spaced ribs 3a (FIG. 4). These ribs are joined to a plurality of radially-extending ribs 4a formed on the inner face of the housing end wall 4.

The illustrated valve further includes a cylinder 14 having an outer diameter equal to the inner diameter of ribs 3a so as to be snugly received within the ribs and to provide axial passageways for the flow of the fluid between the ribs. Cylinder 14 is closed at one end by an end wall 15 which engages the radial ribs 4a formed in the housing end wall 4 such that the flow passageways between ribs 3a continue between ribs 4a to the housing outlet 7. Cylinder 14 is open at its opposite end and is of a length slightly less than the distance between housing end wall 4 and internal partition 8 so as to define a passageway 16 from the cylinder interior to the main flow passageways externally of the cylinder between ribs 3a and 4a to the outlet 7.

The inner surface of end wall 15 of cylinder 14 is formed with a plurality of embossments 17 engageable with annular shoulder 13 of the valve stem 11 to prevent end wall 15 from closing passageway 11a through valve stem 11 in the closed position of the valve member illustrated in FIG. 1.

Figure 2:
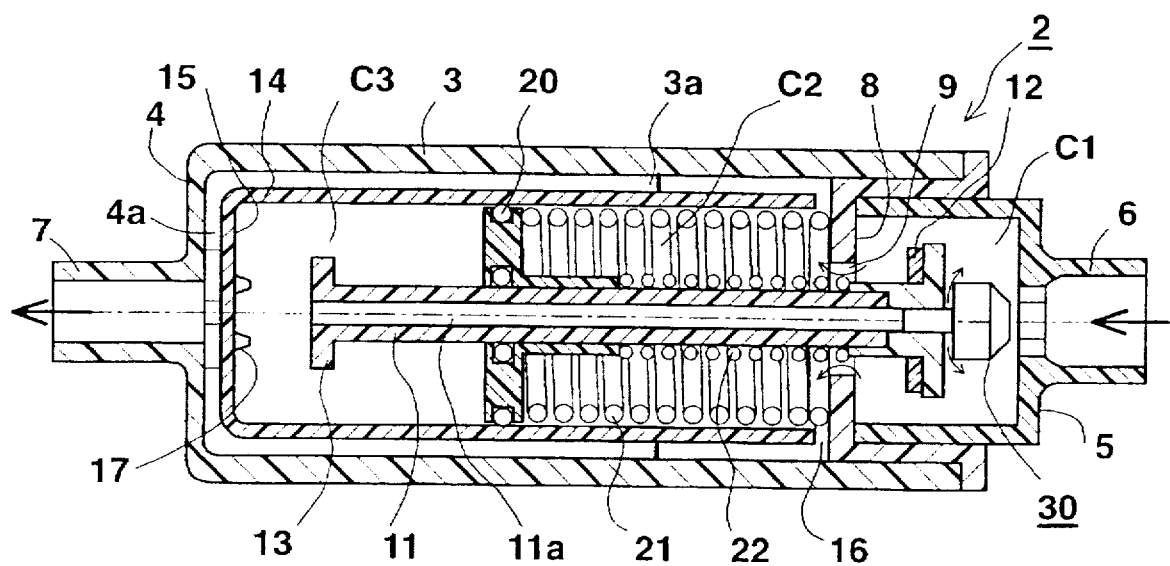
FIG. 2 is a view similar to that of FIG. 1 but showing the valve in its open condition.

A piston 20 having an outer diameter equal to the inner diameter of cylinder 14 is displaceable along valve stem 11 so as to define a control chamber $C_3$ with end wall 15 of cylinder 14. FIG. 1 illustrates one extreme position of piston 20, adjacent to cylinder end wall 15, wherein control chamber $C_3$ is of minimum volume; in this position, the valve member 12 closes the valve opening 9. FIG. 2 illustrates the other extreme position of piston 20, remote from cylinder end wall 15, wherein control chamber $C_3$ is of maximum volume, whereupon valve member 12 is in its open position.

An outer coiled spring 21 is interposed between piston 20 and partition 8, urging the piston to its valve-closed position as illustrated in FIG. 1. An inner spring 22 is interposed between a collar 20a on piston 20, and another collar 12a on valve member 12, also urging the piston to the valve-closed position illustrated in FIG. 1. As will be described more particularly below, the inner spring 22 serves as a lost-motion connection between piston 20 and valve member 12 effective, when the piston has been displaced a predetermined amount (rightwardly, FIGS. 1 and 2) upon the expansion of control chamber C3, to move the valve member 12 to its open position as illustrated in FIG. 2.

Figure 6:
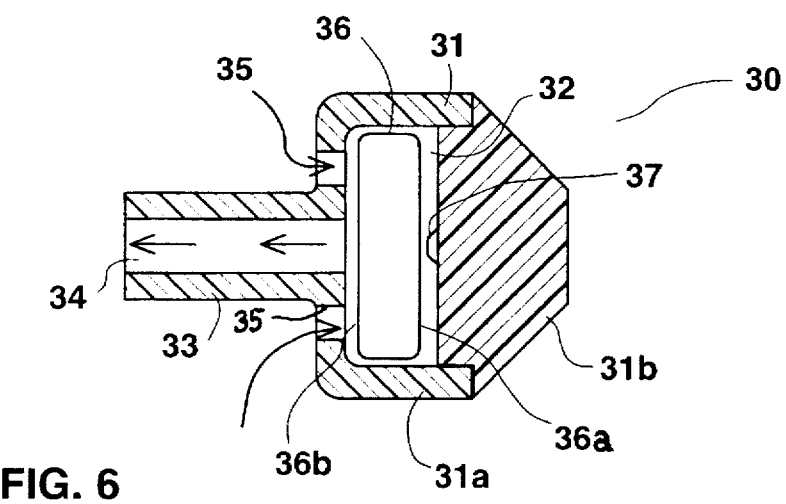
FIG. 6 is a longitudinal sectional view of the flow restrictor in the valve of FIGS. 1 and 2.

The inlet chamber $C_1$ communicates through passageway 11a in valve stem 11 with control chamber $C_3$ via a flow restrictor device, generally designated 30. Device 30 restricts the flow into control chamber $C_3$ when the valve is closed (FIG. 1) or from control chamber $C_3$ when the valve is open (FIG. 2). Flow restrictor device 30 may be any one of the flow-restrictor devices commonly used at the present time in drip irrigation emitters to restrict the flow out of a water supply line to the root region of a plant. FIG. 6 more particularly illustrates one construction of flow restrictor device 30 that may be used for this purpose.

The flow restrictor device 30 illustrated in FIG. 6 comprises a housing 31 made of two sections 31a, 31b fixed together to define an internal chamber 32. Housing section 31a is integrally formed with a sleeve 33 which is received, e.g., with a press-fit, into the end of the hollow stem 11, thereby defining a port 34 communicating with passageway 11a of stem 11. Wall 31a of housing 31 is further formed with a plurality of openings 35 serving as additional ports communicating with chamber 32 within the housing.

An oscillating member or disc 36 is freely movable within chamber 32 of housing 31. One side of disc 36 is engageable with a projection 37 formed on the inner face of housing section 31b to space the disc from that face of the housing, whereas the other face 36b of the housing is adapted to open and close ports 34 and 35 during the oscillations of the disc.

FIG. 6 illustrates the direction of flow of the fluid from inlet chamber $C_1$ into chamber 32 of the flow restrictor device 30 via ports 35, and out of chamber 32 via port 34 into passageway 11a in valve stem 11 and into control chamber $C_3$ during the closed condition of valve member 12, as illustrated in FIG. 1. FIG. 2 illustrates the reverse flow that occurs through the flow restrictor device in the open condition of valve member 12, wherein it will be seen that the fluid flows from control chamber $C_3$ via passageway 11a and port 34 into chamber 32 of the flow restrictor device 30, and out of that chamber via ports 35 into the inlet chamber $C_1$. During both flow conditions, disc 36 is set into rapid oscillations opening and closing ports 35 and 34, and thereby restricting the flow through the flow restrictor device 30.

The illustrated valve operates as follows:

FIG. 1 illustrates the normal condition of the valve when it is not connected to the line, or if connected, when there is no pressure in the line. In this normal condition, spring 21 urges piston 20 to the left-most position of the piston, as shown in FIG. 1, wherein control chamber $C_3$ is of minimum volume. In this position of the piston, it presses annular shoulder 13 of valve stem 11 towards embossments 17 formed in the inner face of end wall 15 of cylinder 14, thereby moving valve member 12, at the opposite end of stem 11, to its closed position with respect to valve opening 9. Accordingly, in this condition of the valve, valve member 12 is in its closed condition with respect to valve opening 9.

When pressurized fluid is applied to the inlet 6, the fluid enters the inlet chamber $C_1$ and flows via the flow restrictor device 30 and passageway 11a into control chamber $C_3$ at a rate determined by the parameters of the flow restrictor. The increase in pressure built up in control chamber $C_3$ displaces piston 20 rightwardly against the actions of springs 21 and 22, as control chamber $C_3$ expands.

Spring 22, however, is a relatively light spring so that the force applied by the spring against valve member 12 is initially insufficient to overcome the inlet pressure force applied to the valve member tending to close the valve; the valve thus remains closed during this movement of the valve member. However, after the valve member has been moved a predetermined amount, the loading of the inner spring 22 becomes sufficient to overcome the force applied to the valve member by the inlet pressure, so that the valve member is moved to its open position. This movement of the valve member to its open position is by a snap-action since the closing force applied by the inlet pressure immediately drops as soon as the valve member starts to open.

When the valve member 12 has thus been opened (FIG. 2), the fluid applied to the inlet 6 flows via the inlet chamber $C_1$, valve opening 9, the spaces between the axial ribs 3a and the radial ribs 4a of the housing 3 and its end wall 4, and through the outlet 7. In addition, the fluid within control chamber $C_3$ flows out of that chamber via passageway 11a and flow restrictor 30 into the inlet chamber $C_1$, and from that chamber it joins with the flow through the valve opening 9 to the outlet port 7. Piston 20 is thus displaced leftwardly to contract control chamber $C_3$ until it engages annular shoulder 13 of the valve stem 11 to move the valve stem (leftwardly, FIG. 1), and thereby the valve member 12 to its closed position with respect to the valve opening 9. The valve is thus now in its closed condition and ready for a new cycle of operation as described above.

It will be seen that the flow restrictor device 30 can be selected to produce the desired rate of flow into control chamber $C_3$ when the valve is closed, and out of the control chamber when the valve is opened, thereby enabling the closed and open intervals of each cycle of operation of the valve to be preset. The valve-open interval may be the same as or different from the valve-closed interval of each cycle, this being determined by the relative cross-sectional areas of the ports 34 and 35 of the flow restrictor device 30. It will also be seen that a flow occurs in one direction through the flow restrictor device 30 and stem passageway 11a during one part of each cycle, and in the opposite direction during the other part of the cycle. The flow restrictor device 30, passageway 11a, and substantially the complete volume of control chamber $C_3$ are therefore flushed, by fresh fluid from the inlet, into the outletted fluid during each operation of the valve so that the valve has a very low sensitivity to clogging by particles in the fluid.

It will be appreciated that the invention could be used in many diverse applications involving the control of a liquid (e.g., water) or a gas (e.g., air). Also, it could be used in applications involving a single cycle of operation, e.g., in a toilet flushing system wherein the valve is manually opened and automatically closed after a predetermined quantity of water has passed or after a predetermined time has elapsed. Many other variations, modifications and applications of the invention will be apparent.

I claim:

1. A fluid flow control valve, comprising:

a housing having an inlet connectible to a source of pressurized fluid, an outlet connected to said inlet via a connecting passageway, and a valve opening in said connecting passageway;

a valve member movable to an open position and to a closed position with respect to said valve opening;

a spring normally urging said valve member to its closed position with respect to said valve opening;

and an actuator for actuating said valve member to its open and closed positions; said actuator including;

a valve stem fixed at one end to said valve member and formed with a passageway therethrough leading to its opposite end;

a cylinder having an end wall at said opposite end of the stem;

a piston displaceable along said stem to positions adjacent to and remote from said cylinder end wall to define therewith an expansible-contractible control chamber;

said valve stem passing through said valve opening and into said control chamber such that one end of the passageway through the valve stem leads to said housing inlet, and the opposite end of the passageway through the valve stem leads into said control chamber;

and a restrictor within said passageway in the stem for restricting the fluid flow between said inlet and said control chamber;

said control chamber being expansible, when the valve member is in its closed position, by receiving a quantity of fluid from the housing inlet via said stem passageway to move said valve member to its open position, and being contractible to return the fluid to the housing inlet via said valve stem passageway and said restrictor when said valve member has been moved to its open position to discharge a quantity of fluid from the housing inlet via said housing outlet, such that repeated operations of said valve repeatedly flush substantially the complete volume of said control chamber, as well as said valve stem passageway and said restrictor, with fresh fluid from said source of pressurized fluid.

2. The valve according to claim 1, wherein said valve stem carries an annular shoulder at the end thereof opposite to said valve member and engageable by the piston at the end of the contraction of said control chamber to move the valve member to its closed position.

3. The valve according to claim 1, wherein said housing includes axially-extending ribs on its inner face defining with the outer face of said cylinder large flow passageways between said valve opening and said housing outlet.

4. The valve according to claim 1, wherein said flow restrictor includes a housing formed with at least two ports, and an oscillating member freely movable within said restrictor housing for opening and closing said ports to restrict the flow therethrough.

5. The valve according to claim 1, wherein said actuator includes a lost-motion coupling between said piston and said valve member effective when the piston has been displaced a predetermined amount upon the expansion of said control chamber, to move said valve member to its open position.

6. The valve according to claim 5, wherein said lost-motion connection includes a second spring which is loaded by the displacement of the piston during the expansion of said control chamber such as to produce a snap-action opening of said valve member when the piston has been displaced said predetermined amount.

7. A fluid flow control valve, comprising:

a housing having an inlet, an outlet, an internal partition defining an inlet chamber communicating with said inlet and an outlet chamber communicating with said outlet, and a valve opening in said partition connecting said inlet chamber to said outlet chamber;

a valve assembly within said housing including a stem, and a valve member in said inlet chamber carried by one end of said stem and movable to an open position or to a closed position with respect to said valve opening;

a cylinder within said outlet chamber enclosing a portion of said stem therein, said cylinder being closed at one end by an end wall adjacent to said housing outlet and open at the opposite end adjacent to said partition;

a piston displaceably mounted on said stem within the outlet chamber to positions adjacent to and remote from said cylinder end wall to define an expansible-contractible control chamber therewith;

a spring urging said piston towards said end wall of the cylinder to contract said control chamber and to move the valve member towards its closed position with respect to said valve opening;

said valve stem sassing through said valve opening and said outlet chamber such that one end of said stem, carrying said valve member, is in said inlet chamber, and the opposite end of said valve stem is in said control chamber;

a passageway through said valve stem establishing communication between said inlet chamber at said one end of the valve stem, and said control chamber at said opposite end of the valve stem, such that an inlet pressure in said inlet chamber tends to expand said control chamber and to displace said piston towards said valve member against the force of said spring;

a flow restrictor in said passageway for restricting the flow therethrough between said inlet chamber and said control chamber;

and a coupling between said piston and said valve member;

said control chamber being expansible by the displacement of the piston to a position adjacent to said cylinder end wall, when receiving a quantity of fluid via the housing inlet and said stem passageway while said valve member is in its closed position, to move the valve member to its open position, and being contractible by the displacement of the piston to a position remote from said cylinder wall when said valve member has moved to its open position to discharge a quantity of fluid via said housing outlet, such that repeated operations of said valve repeatedly flush substantially the complete column of said control chamber, said valve stem passageway, and said restrictor, with fresh fluid from said source of pressurized fluid.

8. The valve according to claim 11, wherein said flow restrictor is located at the end of said valve stem within said inlet chamber.

9. The valve according to claim 8, wherein said flow restrictor includes a housing formed with at least two ports, and an oscillating member freely movable within said restrictor housing for opening and closing said ports to restrict the flow therethrough.

10. The valve according to claim 8, wherein said coupling includes a lost-motion connection between said piston and said valve member effective, when the piston has been displaced a predetermined amount, to move said valve member to its open position.

11. The valve according to claim 10, wherein said lost-motion connection includes a second spring which is loaded by the displacement of the piston during the expansion of said control chamber, such as to produce a snap-action opening of said valve member when the piston has been displaced said predetermined amount.

12. The valve according to claim 11, wherein said second spring is a coiled spring coaxial with said stem and interposed between said piston and valve member.

13. The valve according to claim 7, wherein said housing includes axially-extending ribs on its inner face defining with the outer face of said cylinder large flow passageways between said valve opening and said housing outlet.

14. The valve according to claim 7, wherein said valve stem carries an annular shoulder at the end thereof opposite to said valve member engageable with the piston to move the valve member to its closed position when the control chamber is of minimum volume.

15. The valve according to claim 14, wherein there is a spacer element between said annular shoulder of the valve stem and the inner face of the end wall of the cylinder to prevent closure of said passageway through the valve stem by engagement of the annular shoulder of the valve stem with said end wall of the cylinder.

* * * * *